(12) United States Patent
Young et al.

(10) Patent No.: US 11,989,828 B2
(45) Date of Patent: May 21, 2024

(54) METHODS FOR GENERATING AND UPDATING BUILDING MODELS

(71) Applicant: TRX Systems, Inc., Greenbelt, MD (US)

(72) Inventors: Travis Young, Rockville, MD (US); Daniel Hakim, Silver Spring, MD (US); Daniel Franchy, Catonsville, MD (US); Jared Napora, Severn, MD (US); John Karvounis, Bowie, MD (US); Jonathan Fetter Degges, Washington, DC (US); Tim Wang, Germantown, MD (US); Benjamin Funk, Hanover, MD (US); Carole Teolis, Glendale, MD (US); Carol Politi, Bethesda, MD (US); Stuart Woodbury, Ellicott City, MD (US)

(73) Assignee: TRX SYSTEMS, INC., Greenbelt, MD (US)

(*) Notice: Subject to any disclaimer, the term of this patent is extended or adjusted under 35 U.S.C. 154(b) by 223 days.

(21) Appl. No.: 17/475,935

(22) Filed: Sep. 15, 2021

(65) Prior Publication Data
US 2022/0139031 A1   May 5, 2022

Related U.S. Application Data

(60) Division of application No. 16/989,212, filed on Aug. 10, 2020, now abandoned, which is a continuation of (Continued)

(51) Int. Cl.
G06T 17/05 (2011.01)
G01C 21/00 (2006.01)
G06F 30/13 (2020.01)

(52) U.S. Cl.
CPC .......... G06T 17/05 (2013.01); G01C 21/3867 (2020.08); G06F 30/13 (2020.01)

(58) Field of Classification Search
CPC ..... G06T 17/05; G06T 19/20; G06T 2219/20; G06F 30/13
See application file for complete search history.

(56) References Cited

U.S. PATENT DOCUMENTS

| | | | |
|---|---|---|---|
| 8,688,375 B2 | 4/2014 | Funk et al. | |
| 8,706,414 B2 | 4/2014 | Funk et al. | |

(Continued)

*Primary Examiner* — King Y Poon
*Assistant Examiner* — Vincent Peren
(74) *Attorney, Agent, or Firm* — BakerHostetler

(57) ABSTRACT

Systems, methods and instructions for creating building models of physical structures is disclosed. The building model may be a collection of floors defined by outlines containing regions that may be offset relative to a main region, and a collection of connectors. Connectors may have connection points for tracking, routing and sizing. Connectors may indicate elevation changes through georeferenced structural features. Signal elements may also be features that provide corrections when tracking. Feature descriptors are data that describes the structural configuration and signal elements enabling them to be matched to previously collected data in a database. User interface elements assist a user of a tracking device in collecting floor information, structural features and signal features and validating certain collected information based on previously known information. The height of floors may also be inferred based on sensor data from the tracking device.

19 Claims, 12 Drawing Sheets

Related U.S. Application Data application No. 16/428,519, filed on May 31, 2019, now Pat. No. 10,740,965.

(60) Provisional application No. 62/679,718, filed on Jun. 1, 2018.

(56) References Cited

U.S. PATENT DOCUMENTS

| | | |
|---|---|---|
| 8,712,686 B2 | 4/2014 | Bandyopadhyay et al. |
| 8,751,151 B2 | 6/2014 | Funk et al. |
| 8,965,688 B2 | 2/2015 | Bandyopadhyay et al. |
| 8,990,049 B2 | 3/2015 | Plocher et al. |
| 9,008,962 B2 | 4/2015 | Bandyopadhyay et al. |
| 9,046,373 B2 | 6/2015 | Bandyopadhyay et al. |
| 9,146,113 B1 | 9/2015 | Funk et al. |
| 9,322,648 B1 | 4/2016 | Karvounis et al. |
| 9,395,190 B1 | 7/2016 | Young et al. |
| 9,448,072 B2 | 9/2016 | Bandyopadhyay et al. |
| 9,664,521 B2 | 5/2017 | Funk et al. |
| 9,671,224 B2 | 6/2017 | Karvounis et al. |
| 9,733,091 B2 | 8/2017 | Kordari et al. |
| 9,823,068 B2 | 11/2017 | Karvounis et al. |
| 2002/0072881 A1 | 6/2002 | Saitta |
| 2003/0135324 A1 | 7/2003 | Navab |
| 2008/0077326 A1 | 3/2008 | Funk et al. |
| 2009/0216438 A1 | 8/2009 | Shafer |
| 2012/0029817 A1 | 2/2012 | Khorashadi et al. |
| 2012/0166147 A1 | 6/2012 | Kwak |
| 2012/0303176 A1* | 11/2012 | Wong ............... G01S 17/89 701/1 |
| 2015/0121122 A1 | 4/2015 | Towstopiat et al. |
| 2016/0027124 A1 | 1/2016 | Rojas |
| 2016/0195400 A1 | 7/2016 | Young et al. |
| 2017/0103145 A1 | 4/2017 | Wither et al. |
| 2017/0146349 A1 | 5/2017 | Yang et al. |
| 2018/0121571 A1 | 5/2018 | Tiwari et al. |
| 2018/0252535 A1* | 9/2018 | Bhimavarapu ....... G01S 5/0295 |
| 2018/0283872 A1* | 10/2018 | Robinson ............ G06Q 10/08 |
| 2019/0297479 A1 | 9/2019 | Huberman et al. |
| 2020/0372707 A1 | 11/2020 | Young et al. |

\* cited by examiner

FIG. 19

CONTROL PANEL

| SUBSCRIPTION ID | TILE X | Query | Update |
| BUILDING ID | TILE Y | Save | |

FLOOR HEIGHTS TABLE & CORRELATION MATRIX

1902

| FLOOR NUMBER | DELTA FLOOR HEIGHTS (m) | Sqr |
|---|---|---|
| T | 42.78 | 0.09 |
| -1 | 3.50 | 10.00 |
| 0 | 3.07 | 0.12 |
| 1 | 1.38 | 7.07 |
| 2 | 1.38 | 7.07 |
| 3 | 3.77 | 8.66 |
| 4 | 3.77 | 8.68 |
| 5 | 3.77 | 8.66 |
| 6 | 3.77 | 8.68 |
| 7 | 3.50 | 10.00 |
| 8 | 3.50 | 10.00 |
| 9 | 3.50 | 10.00 |

1904

Building Observations Table

1906

| Delete | Building Rev. | Start Floor | End Floor | Delta Hgt (m) | Height Difference |
|---|---|---|---|---|---|
| ☑ | 23 | 3 | | -44.20 | 0.28 |
| ☑ | 23 | 1 | 0 | -3.39 | 0.19 |
| ☑ | 23 | | 3 | 42.16 | 0.36 |
| ☐ | 23 | 3 | | -45-85 | 0.20 |

METHODS FOR GENERATING AND UPDATING BUILDING MODELS

CROSS REFERENCE TO RELATED APPLICATIONS

This application is a divisional of U.S. patent application Ser. No. 16/989,212, filed Aug. 10, 2020; which is a continuation of U.S. patent application Ser. No. 16/428,519, filed May 31, 2019, now U.S. Pat. No. 10,740,965 issued Aug. 11, 2020; which claims benefit under 35 U.S.C. § 119(e) of Provisional U.S. Patent Application No. 62/679,718, filed Jun. 1, 2018; the contents of each of which are incorporated herein by reference in their entirety.

GOVERNMENT RIGHTS

This invention was made with government support under Contract No. W31P4Q-18-C-0003 awarded by the United States Army, pursuant to a DARPA SBIR grant entitled "Handheld Apps for Warfighters," and under Contract No. DTFH6117C00017 awarded by the Federal Highway Administration, pursuant to an Accessible Transportation Technologies Research Initiative award entitled "Smart Wayfinding and Navigation Using High Accuracy 3D Location Technology. The government has certain rights in the invention.

TECHNICAL FIELD

The present disclosure is directed to mapping structures, such as complex buildings, in three dimensions.

BACKGROUND

Signal data has been used to identify the location of mobile devices for many years. The signal data collected by such devices may also be used to identify physical structure in areas around the device, such as transitions between outside a structure and inside a structure, when a device is near a window (in which case it may be able to receive GPS data), and certain structure can be inferred based on the signal data, such as hallways, stairways, and elevators.

Numerous commonly assigned patents, all of which are incorporated by reference, describe various of the above aspects, including: U.S. Pat. No. 8,688,375 issued Apr. 1, 2014, U.S. Pat. No. 8,706,414 issued Apr. 22, 2014, U.S. Pat. No. 8,712,686 issued Apr. 29,2014, U.S. Pat. No. 8,965,688 issued Feb. 24, 2015, U.S. Pat. No. 9,008,962 issued Apr. 14, 2015, U.S. Pat. No. 9,046,373 issued Jun. 2, 2015, U.S. Pat. No. 9,448,072 issued Sep. 20, 2016, U.S. Pat. No. 8,751,151 issued Jun. 10, 2014, U.S. Pat. No. 9,146,113 issued Sep. 29 2015, U.S. Pat. No. 9,664,521 issued May 30, 2017, U.S. Pat. No. 9,322,648 issued Jun. 16, 2016, U.S. Pat. No. 9,823,068 issued Nov. 21, 2017, U.S. Pat. No. 9,395,190 issued Jul. 19,2016, U.S. Pat. No. 9,671,224 issued Jun. 6, 2017, and U.S. Pat. No. 9,733,091 issued Aug. 15, 2017.

The mapping of complex buildings is often done with handheld devices that have limited display and user interface capabilities. While the techniques described therein may be adequate for generating maps of the physical structure based on simple building footprints, complex buildings cannot be well described or mapped by as such and present new problems, require novel technical solutions disclosed herein.

SUMMARY

The present disclosure is directed to systems, methods and instructions for building models of physical structures that enable representation and visualization of complex structures. A building model may be created as a collection of floors that may be above or below ground. A floor may be defined by an outline, where the outline contains a collection of flat regions that may be offset relative to the floor, and a collection of connectors to the floor. A connector may be a polygon that may be flat or change elevation. Connectors may have a set of connection points for tracking and routing, as well as editing points for visualization, i.e., sizing the connector. Connectors may attach to points on the same floor or attach to different floors or different buildings. Connectors may have information defining their three-dimensional display and editing functionality, such as size, orientation, straight stairs, u-shaped stairs, etc. Editing points may allow a user to size and rotate the polygon defining a connector.

A feature may be a georeferenced structural or signal element that can be matched to provide a correction when tracking. A feature descriptor may be a set of data that describes the structural configuration and signal elements enabling it to be more robustly matched. Many features may correspond to connectors, such as stairwells, elevators, and escalators. These structural features may be represented as a combination of a model and other descriptor information. The model may contain location information such as a two-dimensional polygon and list of building floors where the feature is present. The model may be specified by the user or discovered via crowdsourcing. The data in the model can also be used to describe a connector. Additional descriptor information may be based on observations such as sensor and RF data.

BRIEF DESCRIPTION OF THE DRAWINGS

FIG. 19 is an illustration of a user interface element depicting a tool for gathering information about the status of the mapping of a building.

DETAILED DESCRIPTION OF ILLUSTRATIVE EMBODIMENTS

Figure 1:
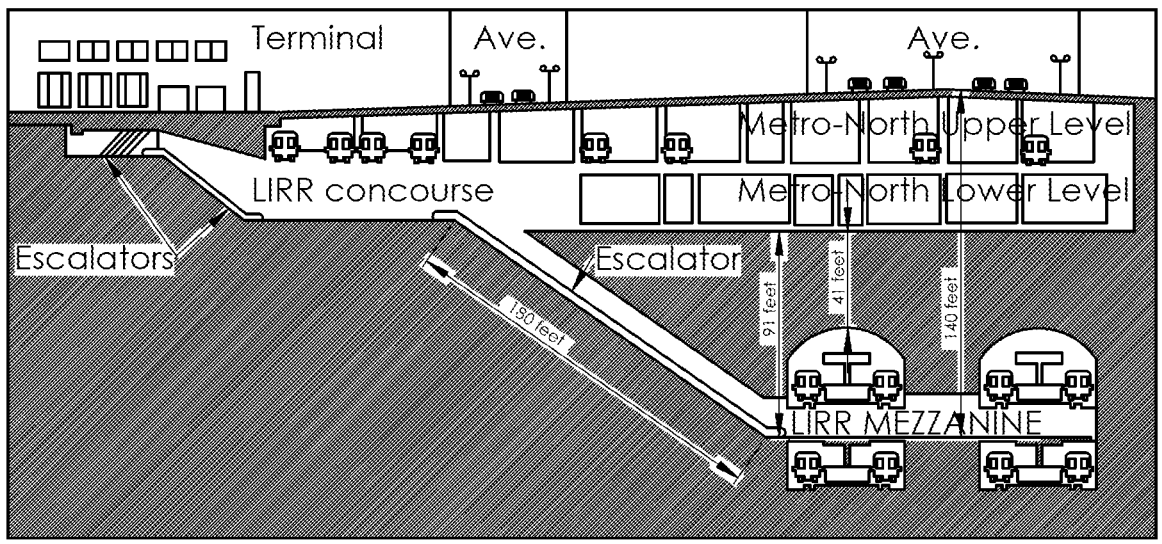
FIG. 1 is an illustration of a complex building, with above ground and below ground sections.
Figure 2:
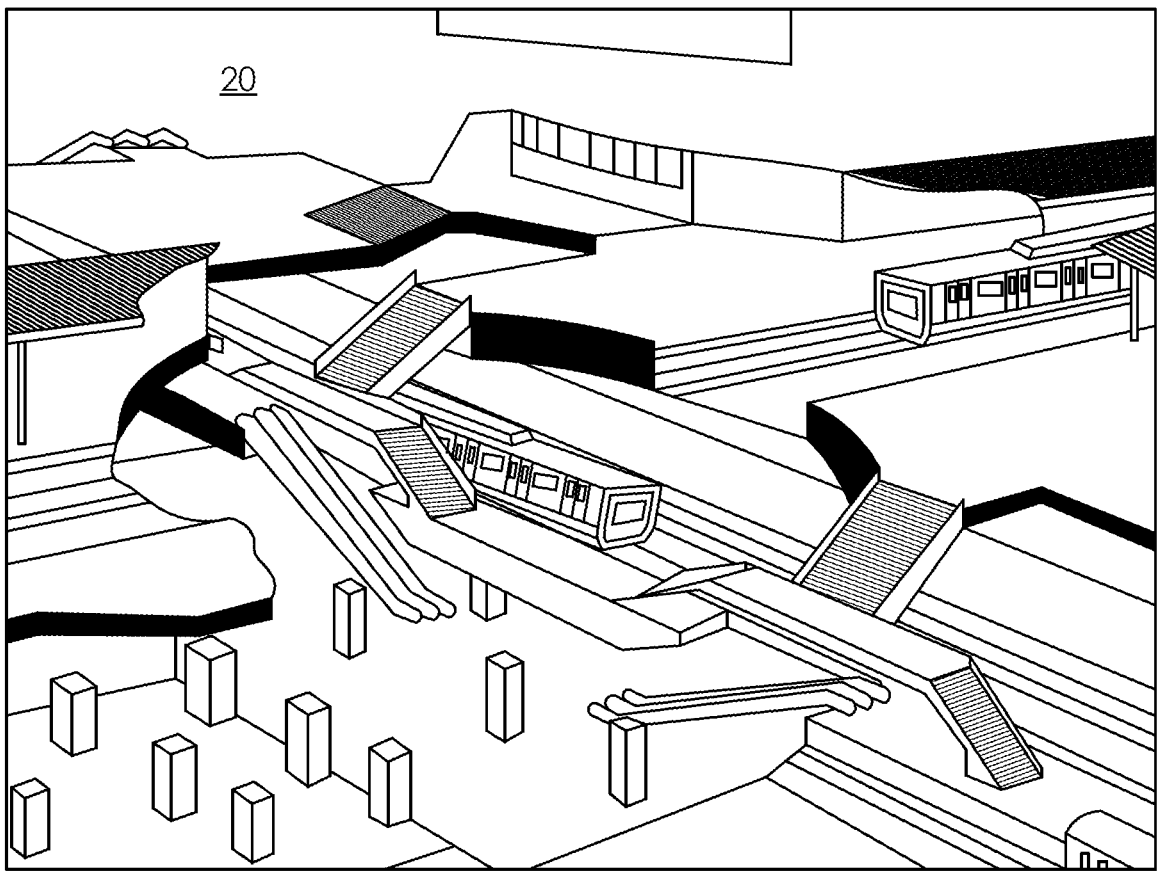
FIG. 2 is a partially-broken illustration of a transportation station with multiple levels of platforms connected by escalators, stairs, elevators, etc.

Urban areas include an increasing number of complex buildings. A complex building is a building that is not well described by a simple building footprint of a single floor or even a stack of above and below ground floors. Transportation hubs are good examples of complex structures as they may include various connections between below ground metros and above ground airports and train stations that are not necessarily vertically aligned. FIG. 1 illustrates Grand Central Terminal 10 in New York City. The terminal includes several blocks of above ground buildings and multiple different underground levels connected by at least escalators and elevators. Another complex building structure 20 is illustrated in FIG. 2. The partially-broken illustration could be an airport with transit-like connections between terminals or a train station with multiple different lines running in different directions. Convention centers also connected to hotels and office buildings and transportation terminals connected to hotels and office buildings are other examples of building structures that may have split level floors or large stair platforms between floors. In addition to more standard elevators, stairs and escalator between different floors and platform, there may also be escalators that skip floors to aid the flow of pedestrian traffic and tunnels that allow passengers to walk or ride between terminals or buildings.

Solutions for modeling complex structures may be necessary to enable and improve upon the three-dimensional tracking of mobile devices (which are carried or worn by people and other types of trackable mobile objects) within such structures. For example, in order to more accurately identify the location of a first responder or equipment during an emergency, especially in a GPS denied environment, such as the underground portions of a building, detailed building floor plans and connecting plans may be required. Structure models may be used in place of basic floor plans and made available to the software systems that may be relied upon to support localization determinations. The structure models may be previously developed by having a tracked person carrying or wearing a trackable device traverse a structure to be mapped. The software and user interface components of the tracked device, referred to herein as a "mapper," may be used to enable accurate tracking and identification of important features, which in turn may be used to develop and improve upon the structure model and location determinations.

In accordance with embodiments, systems, methods and instructions that support building model mapping, particularly those that allow representation and visualization of such complex structures, is disclosed. The building model may be created as a collection of floors that may be above or below ground. A floor may be defined by an outline, where the outline contains a collection of flat regions that may be offset relative to the floor, and a collection of connectors to the floor.

Figure 3:
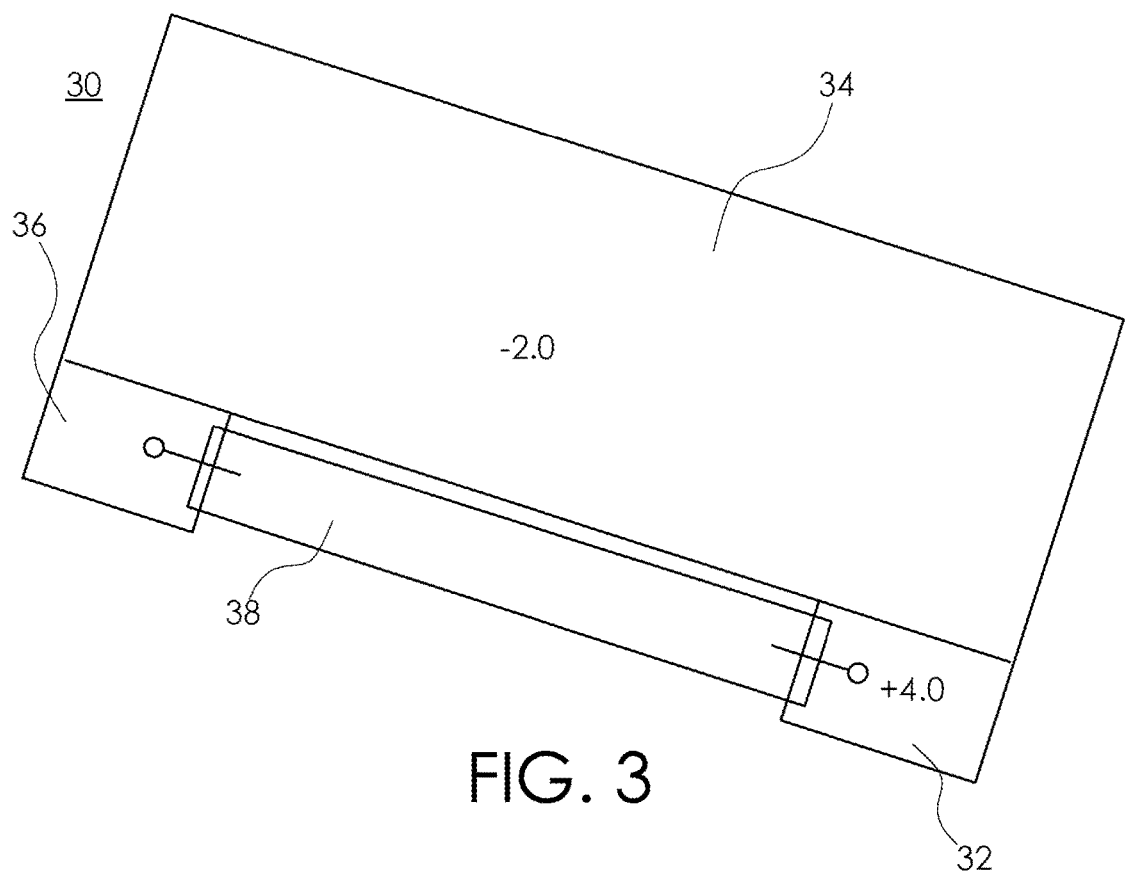
FIG. 3 is a simplified illustration of a floor model with a ramp connector in accordance with an embodiment.

A connector may be a polygon that may be flat, for example, a skywalk between buildings, or it may change elevation, for example, a stairwell or stairway, escalators, or elevators. Connectors may have a set of connection points for tracking and routing, as well as editing points for visualization, i.e., sizing the connector. Connectors may attach to points on the same floor (for example, a ramp that connects two offset regions), or attach to different floors or different buildings. Connectors may have information defining their three-dimension (3D) display and editing functionality. For example, in addition to size and orientation, a stairwell might be straight or u-shaped. Editing points made available through the user interface components may allow the user to size and rotate the polygons defining connectors. FIG. 3 illustrates a simple example of a floor 30 with a region 32 that is offset above, a region 34 that is below a main level 36 and a simple ramp connector 38 that connects the offset regions 32 and 36. More complex connector polygons might be used to represent tunnels in metro systems.

Figure 4:
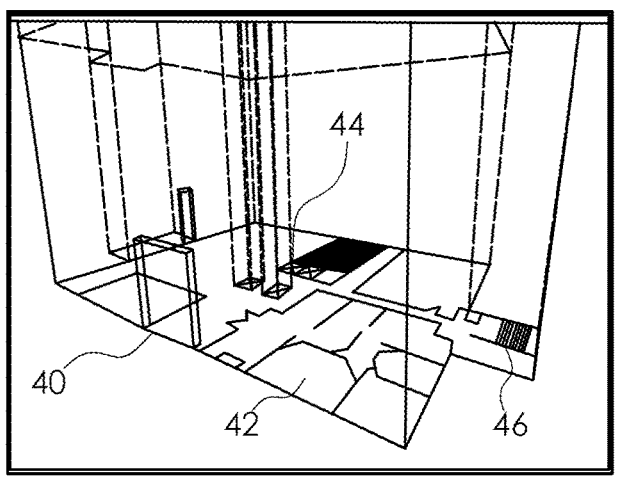
FIG. 4 is an illustration of a two-dimensional floor plan with three-dimensional connectors for exterior corners, an entrance/exit, elevators and stairs in accordance with an embodiment.
Figure 5:
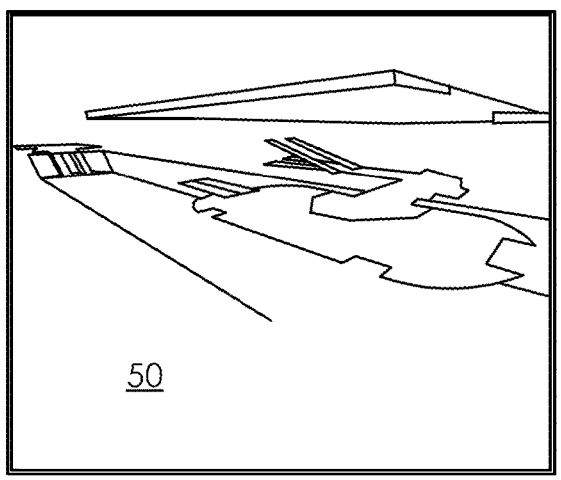
FIG. 5 is a partially-broken illustration of a connector between underground levels and above ground levels of a building in accordance with an embodiment.

Connectors may be preplaced when a building model is created in a command user interface of a mapper, i.e., the body worn/carried device. Some connectors may also be identified based on signals from sensors in the mapper, such as those in many mobile devices. Modern high-end mobile phones include many different sensors, including 3-axis accelerometers, 3-axis gyroscopes, 3-axis magnetometers, pressure sensors, BLE and Wi-Fi receivers, etc. These connectors may be placed as a user operating a mapper device, which may provide a user interface to the users of the mapper, including instructions to a processor therein for how to map the structure, walks through a building. FIG. 4 and FIG. 5 provide example embodiments of how connectors for different types of buildings may be visualized. FIG. 4 illustrates connectors for the entrance/exit 40 of a floor 42 of a building, as well as elevators 44 and stairwells 46 associated with that floor 42. FIG. 5 provides a partially-broken view illustrating various connectors for an underground metro station 50 that includes above ground buildings.

A feature may be a "unique" georeferenced structural or signal element (for example, a connector with a descriptor data, a hallway, an intersection/corner, a Wi-Fi fingerprint) that can be matched to provide a correction within a map of a building structure when tracking a mobile device including instructions to a processor for mapping. A "feature descriptor" may be a set of data that describes the structural configuration and signal elements enabling it to be more robustly matched to a visualized element within a map. For example, a descriptor might include the entry direction and signal data in or near an elevator. A descriptor might also include an entrance, a winding direction for a stairwell or other signal data associated with a stairwell, and signal data (such as sets of Wi-Fi access points with signal strength or other signal measurements) associated with a physical location on a floor or in a hall.

Many features may correspond to structural elements (connectors) in a building, such as stairwells, elevators, and escalators. These structural features may be represented as a combination of a model and other descriptor information. The model may contain location information such as a two-dimensional polygon and a list of building floors where the feature is present. The model may be specified by the user of the mapper device or discovered via crowdsourcing data provided by other similarly equipped mobile devices operating/operated in the same area. A smart phone with mapper software installed on it may be the mapper device. The data in the model may also be used to describe a connector. The additional descriptor information may be based on observations such as sensor and RF data.

Figure 6:
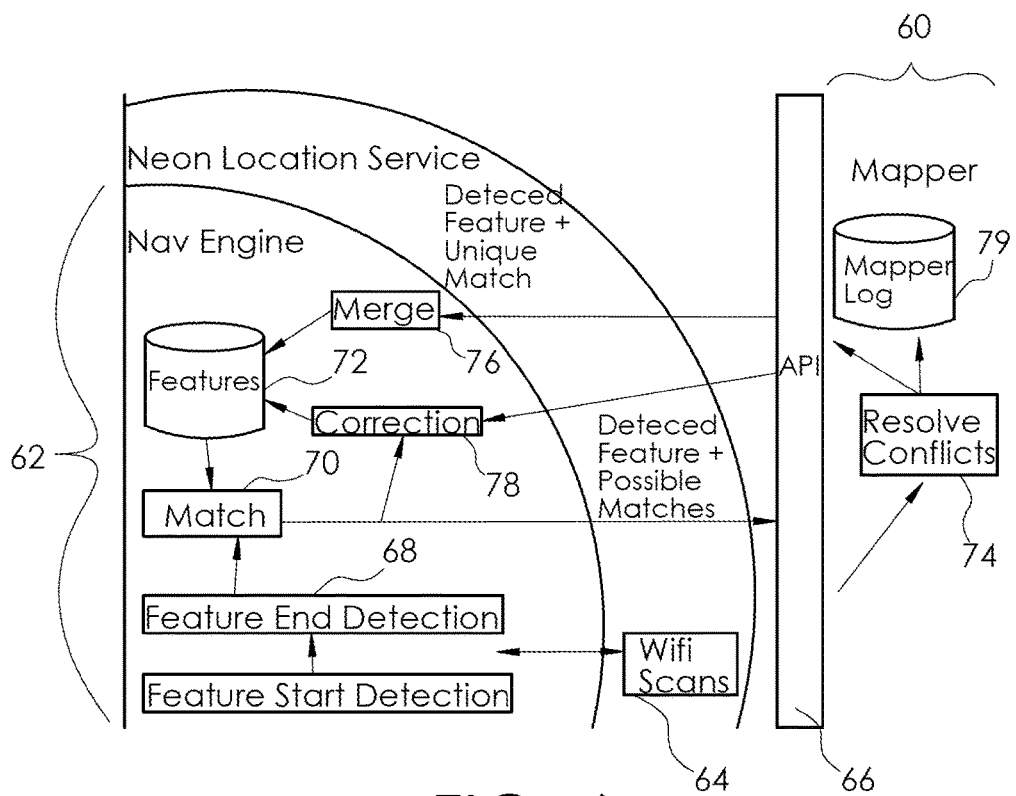
FIG. 6 is a block diagram illustrating interactions between a navigation engine, a location service, an API and mapping components in accordance with an embodiment.

As the user of the mapper device 60, as illustrated in FIG. 6, walks around the inside of a building, while operating the instructions for mapping, descriptor data may be collected. The descriptor data may be based on sensor data from sensors within the mapper device. The descriptor data may then be sent to a navigation engine 60 where the features are formed. For example, RF scans 64 (e.g., Wi-Fi scans, BLE scans, etc.) including sets of ID's and signal strength and ranging data are collected by the location service instructions operating the processor within the mapper device 60. Instructions in the mapper device or in a remote server may cause a processor therein to assign grids to the scans and form them into RF fingerprints. The scans and/or fingerprints may then be sent to the navigation engine through the API 66. Discovered connectors may have other identifying information added, thereby creating a feature that may be more uniquely matched. Mapping based on data collected by the mapper device may facilitate the quick mapping of a facility, versus relying on crowdsourcing data to build the map over time.

The mapper device 60 mapping instruction may expect user interaction. For example, when the location service instructions operate in mapping mode, each detected feature may be sent to a mapper user interface with a list of possible matches to physical features depicted on a floor map that has been uploaded to the mapper device. The user of the mapper device may then choose one of the matches or create a new model. A user's choice may be sent back to the navigation engine 62 along with a new model, if there is one. The navigation engine 62 may then update the feature map locally.

The feature creation process is more fully described with continued reference to FIG. 6. Feature detection may refer to, for example, the detection of a stair connector with other descriptor data, or Wi-Fi scanning and fingerprint creation. Once local features are created, they may be made available locally for the user to correct while tracking, if desired. The features may also be uploaded and merged into a global map and made available through a cloud service for other users to use for correction or to enhance the global map or other maps. When features are sent to the cloud service to be merged into the global map, they may be added to the feature "state" (e.g., location, size, best set of RF data observable).

While the feature state is converging, observations may be saved. This may enable Manual or automated analysis of the observations to remove outliers. For example, as a person walks around a building, based on sensor data from the mapper device (i.e., a body worn/carried sensor, such as the NEON® system marketed by TRX Systems, applicant of the present application), structural or signal features may be discovered. That is, a Wi-Fi fingerprint or a connector's location and describing information (descriptor) may be collected based on sensor data from the mapper device as a tracked person walks around in the building. Because this requires no input from the tracked person, the feature information may also be crowdsourced. However, the convergence of maps may be expedited by having a user maintain accurate locations and by enabling users to immediately validate discovered connectors and elevation changes.

When running the mapping instructions, each time a connector is discovered or the user's elevation changes, the instructions may be configured through the user interface to present the user with the discovered information and prompt the user to validate it. For example, as shown in FIG. 6, a detected feature 68 may be possibly matched 70 to feature information in a database 72. This detected feature 68 and its possible match 70 may then be sent through the API 66 to the mapper device 60 to resolve any conflict 74 between the detected feature 68 and the possible match 70. If the user validates the possible match 70, then the possible match becomes a unique match and is sent back to the navigation engine 62, which it is merged 76 into the database 72. If the possible match is not validated, it can be sent back to the navigation engine to correct 78 the database 72.

Whether map data is preplaced (uploaded or otherwise) in the mapper device or discovered by the sensors and instructions operating in the mapper device, such as when running an Android mapper application on an Android phone, the connectors may be enhanced during mapping and tracking with the detected configuration details and any detected signals. This may serve to improve the robustness of matching. When merged with descriptor data, connector features may enable automated corrections as a tracked person transitions into a building from a linked building or outside.

Figure 7:
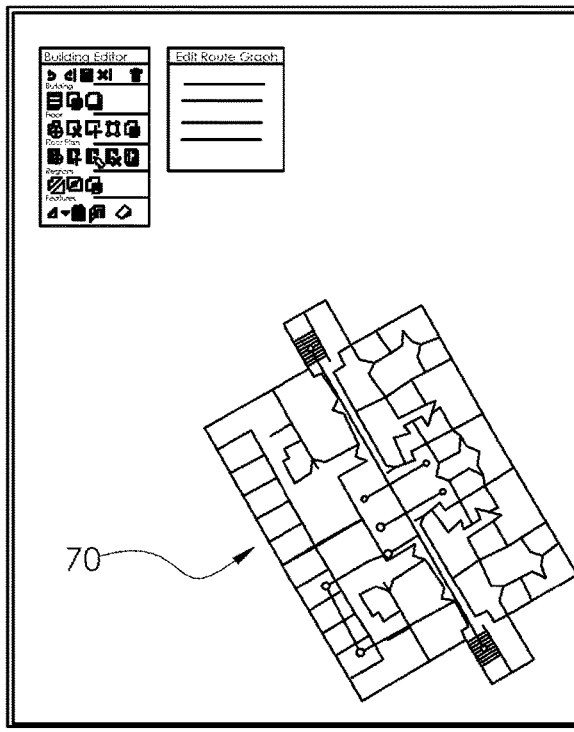
FIG. 7 is an illustration of a user interface element having building editing tool and route graph edit tools for providing an exemplary partial routing graph in two dimensions in accordance with an embodiment.
Figure 8:
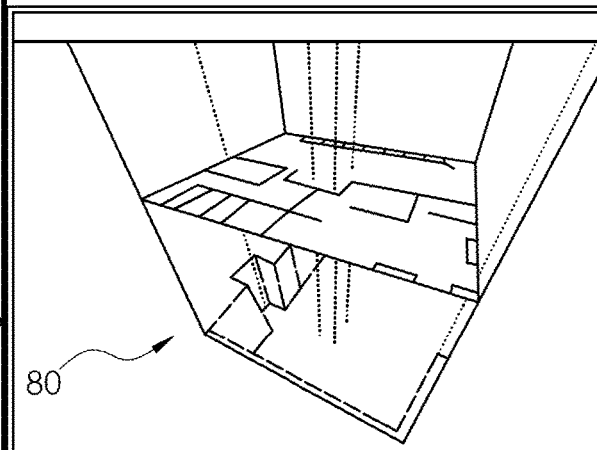
FIG. 8 is an illustration of a user interface element providing an exemplary partial routing graph in three dimensions in accordance with an embodiment.

Connectors placed or discovered and validated in the manners described above may be used as part of a routing graph for the building/structure being mapped. A two-dimensional graph 70 is illustrated in FIG. 7 and a three-dimensional graph 80 is illustrated in FIG. 8. Either graph 70/80 may enable turn-by-turn directions and improve location determination, i.e., as a user moves through a structure, it may be possible to place the user's position based on a most probably route. A tracked user may also input points of interest (e.g., a restroom, a conference room, a store name) for the route. Descriptor data may also be automatically collected for a point of interest such as a location, a floor number, signal data, etc., to help the system/instructions route to that location and confirm that the user has reached the desired point of interest. A larger space, such as a suite in an office building, may be identified for routing as well. A space may be defined by a polygon (potentially multi-level) along with entrances and exits from the space. Users may then be routed to the space. Map feature data collected in the space (e.g., connectors, signals, beacons) may serve to automatically confirm that the tracked person has reached a particular destination.

Figure 9:
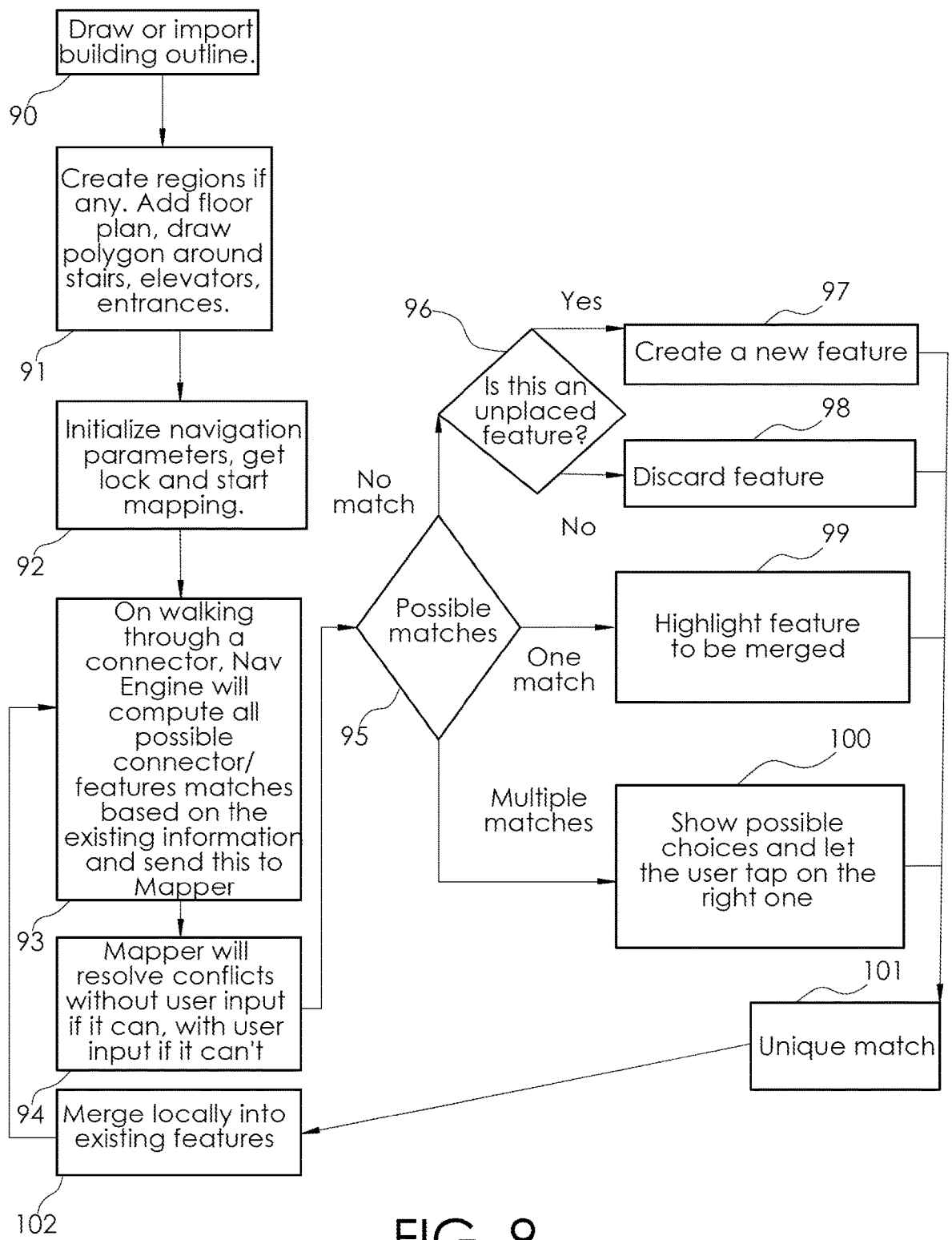
FIG. 9 is flow chart illustrating a mapping workflow for mapping features in accordance with an embodiment.

FIG. 9 provides a flowchart of an embodiment of the mapping workflow for mapping features. Users may be able to provide input to the feature descriptor including the location and size of connectors. A validation step is also available. In addition to mapping connectors, other structural features (e.g., hallways, intersections/corners), signal data and entered points of interest may also be collected and floor heights may be estimated.

The steps of the flowchart depicted in FIG. 9 are explained in more detail below:

Step 90: A building model is created. The building model, if already known and available, may be imported/uploaded. If not, it may be defined by outlining and numbering floors above and below ground. Any offset floor regions may also be created at this time.

Figure 10:
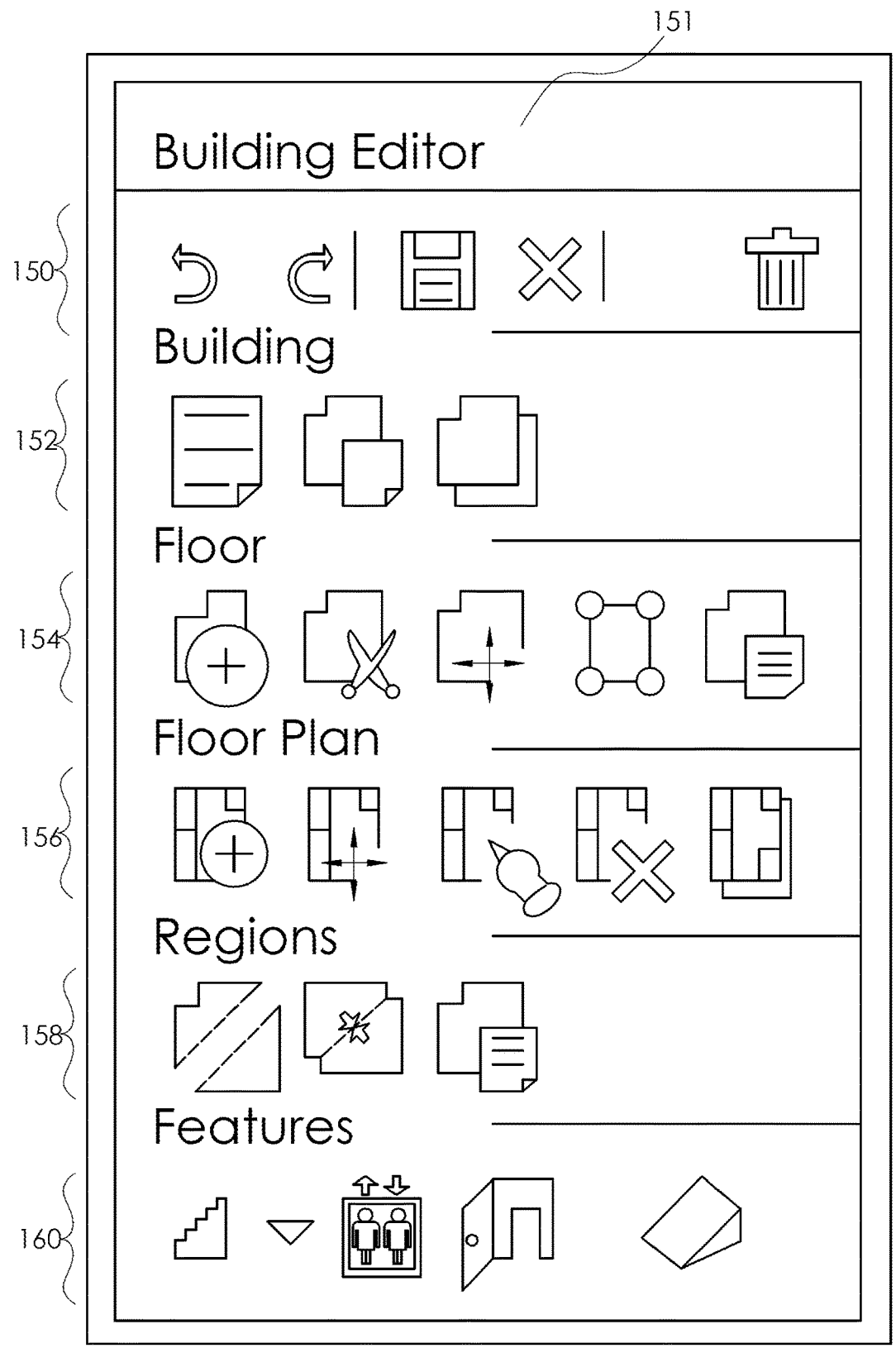
FIG. 10 is an illustration of a user interface element providing a more detailed view of the building editing tool of FIG. 7 in accordance with an embodiment.
Figure 11:
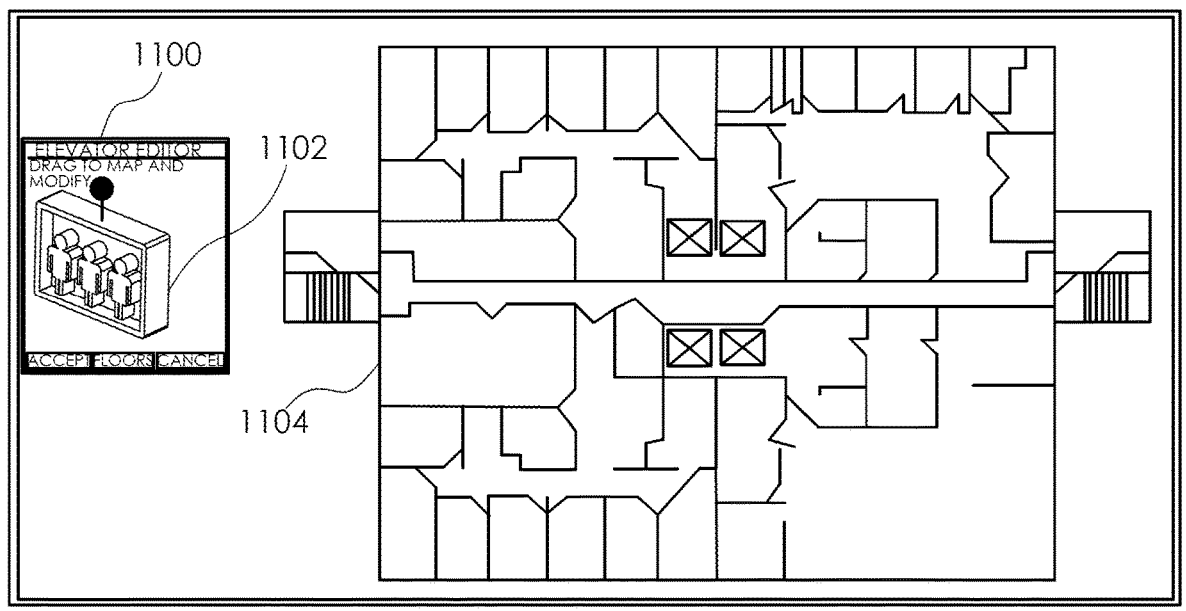
FIG. 11 is an illustration of a user interface element providing an elevator placement tool in accordance with an embodiment.

Regardless of how the building model is created, it can be edited and added onto using a building editor feature of the mapper user interface as illustrated in FIG. 10. The building editor includes various icons corresponding to instructions to the processor that may be used to create and/or edit a building model. Basic control functions icons 150 are placed at the top of the display screen 151 of the user interface of the mapper device. Building features, such as a textual description of the building and/or floors, may then be added/edited through a set of building feature icons 152. Floors may be added, cut, moved, resized and annotated through floor feature icons 154. Floor plans, such as offices, hallways, etc., can be added, moved, pinned, deleted, etc., with floor plan feature icons 156. Regions may be separate and joined and annotated with region feature icons 158. Other features, such as stairs, RF devices, elevators, entry/exits and ramps may be added through feature icons 160. Many other feature icons and corresponding instructions may also be utilized Step 91: Connector polygons may optionally be placed on the created map. By adding connectors/features prior to physically walking around the building, the connectors may be used to provide some level of automated correction even before descriptor data is added during pre-mapping. Feature matching may also be improved by pre-mapping the facility and adding descriptor data to placed connectors. If the user has additional information such as stair type, entry/exit, elevator orientation, etc., this may be entered to speed pre-mapping. User interface tools may be used to simplify the process of locating, orienting and sizing certain features. FIG. 11 illustrate an elevator editor 1100, a user interface tool for placing an elevator, that allows the user to select the elevator icon 1102 and drag it onto the floor map 1104 to place it. Once placed, the elevator icon 1102 can be further modified in terms of size, the floors it services, the orientation of the doors, etc.

Figure 12:
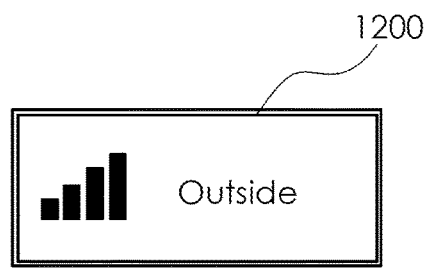
FIG. 12 is an illustration a user interface element providing a navigation lock indication feature in accordance with an embodiment.
Figure 13:
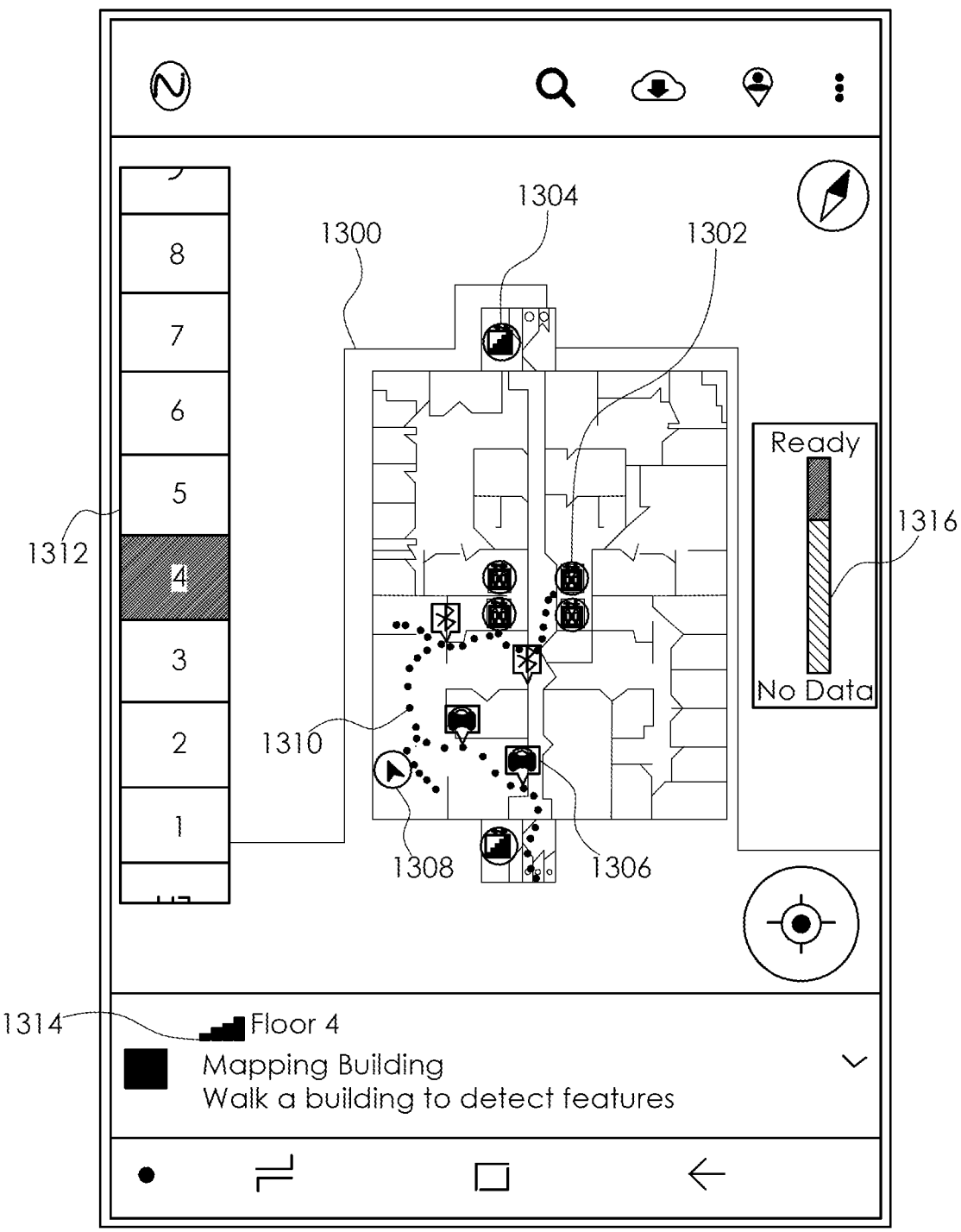
FIG. 13 is an illustration of a user interface element providing a building map and a navigation lock indication feature indicating the status of signal data available within the map in accordance with an embodiment.

Step 92: In order to accurately track the user while mapping a structure, the user may first need to initialize their 3D location, heading, scale and other sensor parameters (e.g., drift). Initialization of these navigation parameters may be computed by using other reference data such as GPS, ranging data (e.g., ranging to know UWB or BLE anchors) or based on user map check-ins. A user is considered to have "locked in" navigation when their 3D position error and heading error have low uncertainty. This is referred to herein as "Nav Lock." A user interface indicator on the mapper device may indicate to the user when Nav Lock has been obtained and mapping can begin. As illustrated in FIG. 12, when the Nav Lock indicator 1200 is a bar scale that shows 4 solid bars, Nav Lock has been obtained. If less than 4 bars are indicated, then Nav Lock may not yet exist. The number of filled in bars in the bar scale illustrated the percentage of readiness toward Nav Lock. As shown in FIG. 12, the user is "outside", which is indicated. If the user is indoors, the Nav Lock indicator 1200 may indicate a floor number, such as illustrated in FIG. 13, where the Nav Lock is associated with "Floor 4."

The user may also view previously mapped features and connectors placed in the map during the initialization step. As illustrated in FIG. 13, icons, shapes, colors or other forms of shading may be used within the map 1300 to indicate different features and connectors. For example, connectors such as elevators and stairwells that have been created and located may be shown by corresponding elevator icons 1302 and stairwell icons 1304. Beacon icons 1306 may be used to indicate signal sources (e.g., Wi-Fi, magnetic). Different shades or colors may be used to indicate the status of certain features. For example, if entry/exit direction of an elevator is known, the elevator icon 1302 may have one color or shade and a different color or shade if the direction is not known. exit direction, have not be added or colored in gray or a first shading. Connectors may be show in their own color or shading. For example, connectors that exist in the global map and which have been traversed, such that descriptor data has been added, may be shown in a first color or shade while connectors shown in a second color or shading may be newly discovered during mapping. The newly discovered connectors may have descriptor data but may not have been uploaded (yet) and merged into the global map. The location of the user doing the mapping may be indicated by a directional icon 1308. The tracked path of the user may be indicated by dots 1310 or other distinguishable symbols.

The floor number (in the case of FIG. 13, the $4^{th}$ floor) corresponding to the floor map may by indicated on a floor indicator 1312 or the Nav Lock indicator 1314. Instructions 1316 to the user may be provided toward the bottom of the display screen of the user interface. Additional Nav Lock indication features may also be included. For example, colors or shading over different parts of the floor may be used to indicate where Nav Lock is possible and where it may not be or where data is available and where it is not. That color or shading on the map may correspond to the sufficiency of the mapping data that has been collected. Areas displayed in a first color or shading may correspond to areas where some data has been collected and areas displayed in a second color may indicate where more mapping is needed. Areas where no data has been collected may be shown in a third color or shading.

A ready data indicator 1316 may include a bar graph to indicate the relative degree of data collection and/or Nav Lock readiness. For example, a darker hatch pattern on the indicator 1316 may indicate where data or Nav Lock may not be available or is limited and a lighter hatch pattern may indicate where data is available, or Nav Lock is possible. Various additional icons may be used to indicate compass position of the mapper device, to allow data to be uploaded to the global map, to drop various beacons or indicators, or to edit details of the map.

Step 93: As a user walks around a building with the mapper device running the mapping instruction signal data is also mapped, for example Wi-Fi and BLE fingerprints, magnetic measurements, etc. For RF fingerprint data, RF and BLE scan descriptors may be assigned to grid squares based on the location of the tracked person during the scan collection. As more scans are taken and fused, the weight of the correction increases.

Figure 14:
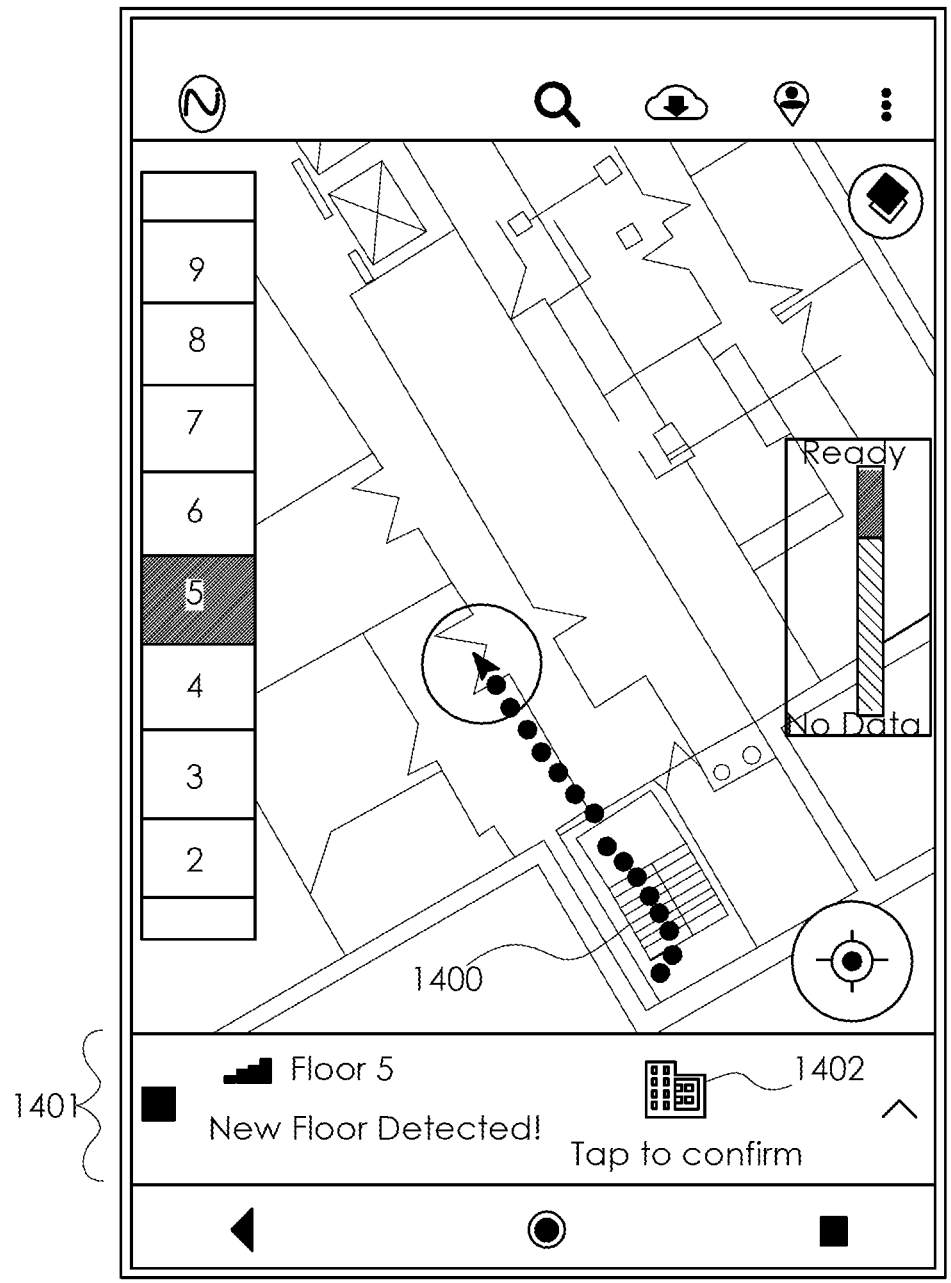
FIG. 14 is an illustration of a user interface element providing an elevation change detection indication in accordance with an embodiment.

Transitions caused by elevators, stairways, ramps, or other elevation changes may be presented to the user with the estimated floor/floor offsets and prompts to the user to confirm. As illustrated in FIG. 14, the user has transitioned from one floor to another through a stairwell 1400. The mapper device user interface indicates at 1401 that a new floor 5 has been detected and requests that the user tap a building icon 1402 to confirm. The user may confirm the estimated floor, correct the floor, or ignore the prompt. When a user confirms the new building floor number, the uncertainty in the measurement may be reduced. More detail on building elevation modeling is described below.

Figure 15:
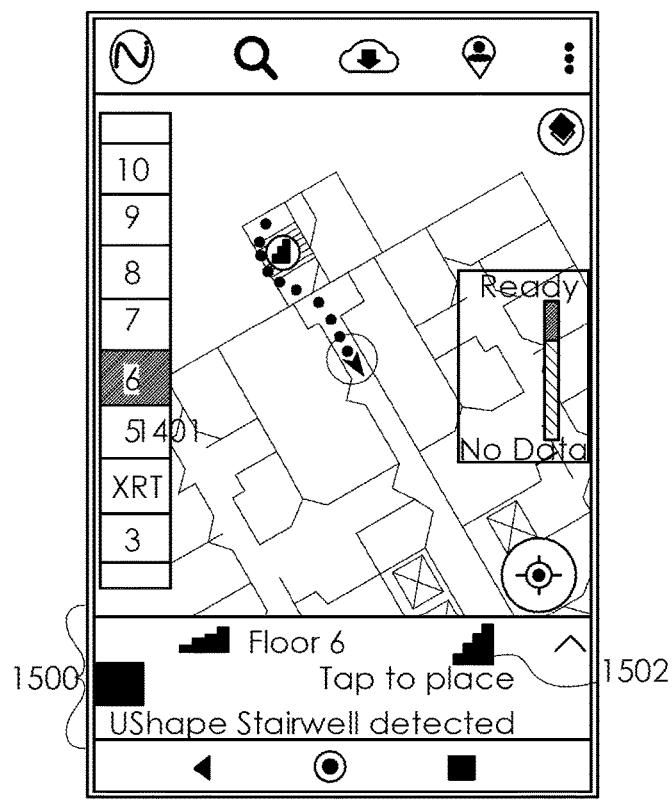
FIG. 15 includes illustrations of a user interface element depicting the discovery of stairwell connectors while mapping a building in accordance with an embodiment.

As the user walks around, connectors may be discovered in proximity to the user, and their description may be generated. FIG. 15 illustrates a discovery message 1500 at the bottom of the display, which states "UShape Stairwell detected—tap to place". This message may be generated by a matching module in the navigation engine, which determines whether the detected connector matches many, one, or none of the previously discovered/placed features/connectors. If the mapper can resolve a possible conflict, i.e., no match or multiple matches, without user input 94, it will, but if not, the user may be requested to help determined what to do. The detected connector and possible matches 95 are sent through the API to the mapping instructions to the user to validate the connector. If not matches are found, the user may be asked 96 what to do with the feature, such as create a new feature 97 or discard the feature 98. If one match is found, the feature may be highlighted to indicate it is a new feature 99 that is to be merged into the database. If multiple possible matches are identified 100, the user may be shown possible choices and requested to select what they believe to be the correct one. Once a determination has been made as to what to do with the detected feature, any unique match 101 is merged locally into the existing features 102 in the map and may eventually be uploaded to update the global database.

Figure 16:
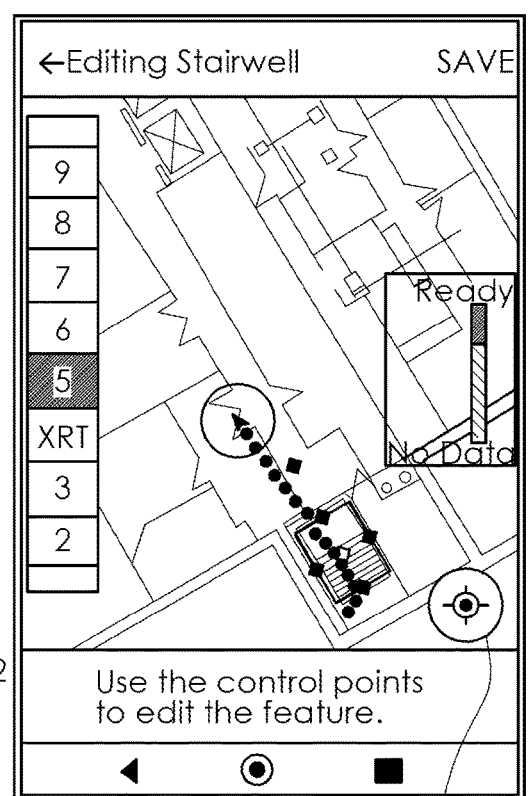
FIG. 16 is an illustration of a user interface element depicting the editing of a stairwell connector in accordance with an embodiment.
Figure 17:
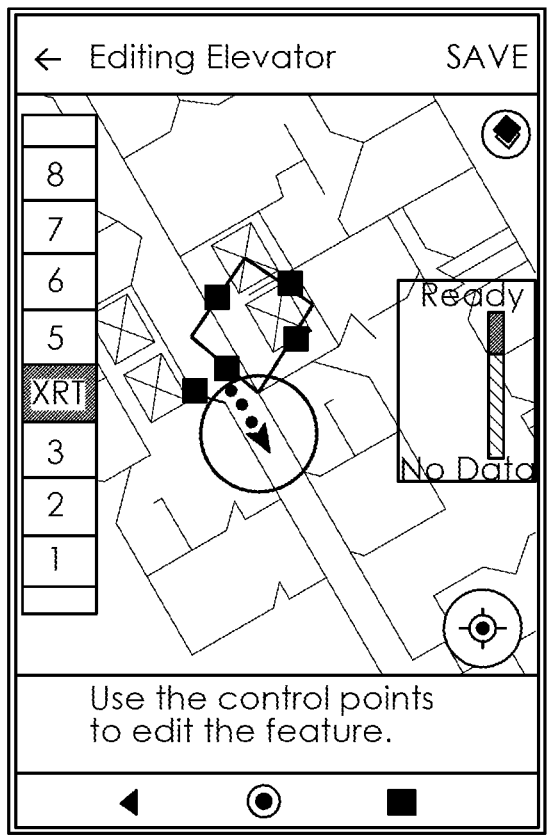
FIG. 17 includes illustrations of a user interface element depicting the discovery of elevator connectors while mapping a building in accordance with an embodiment.
Figure 18:
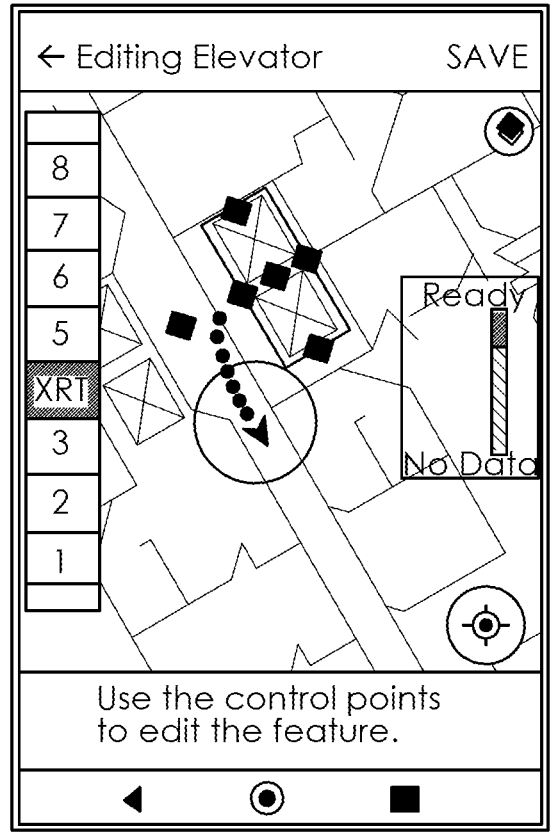
FIG. 18 is an illustration of a user interface element depicting the editing of elevator connectors in accordance with an embodiment.

While working with the mapper instructions, if asked to verify a feature, the user may choose from any one of the existing connector matches, such as the stairwell 1502 shown in FIG. 15, or us a control point 1600 to create/locate and size a new connector, as shown in FIG. 16. FIG. 17 and FIG. 18 illustrate an elevator editor tool being used the edit an elevator to indicate the exits. The detected connector and its verified or created match may then be sent back to the navigation engine and merged into the local map as described in FIG. 9.

Other features may also be discovered based on the user's movement, such as hallways, intersections and rooms that may be used for routing. The user may optionally annotate input points or spaces of interest (e.g., a restroom, conference room, store name) with descriptor data that includes location information, floor number, signal data, etc., which may help the system to route to that location and confirm that the user has reached the desired point of interest.

Detected connectors and any new placed connectors/features may be added to a mapper log 79 (FIG. 9) and displayed in the display associated with the mapper instructions in a specified color or shade as described in relation to FIG. 13.

Once mapping is complete, the whole local map may be uploaded to the cloud and merged with any existing global map. Since detected connectors have already been validated as new or marked with the placed connector it matches to, this can be done optimistically. Mapper log identifying information may be associated with the map observations enabling the mapping instructions to indicate to the user when the map has been merged into the global map and is ready for use. It may also enable the map data to be removed from the map.

As signal and configuration information is added to the placed/discovered connectors, the map may converge until the user sees unambiguous feature matches. New connectors and points of interest may added to the routing graph.

Computing a tracked user's elevation inside a building to the correct floor may be complex. The elevation computation may rely on information from pressure and inertial sensors in the mapper device, terrain elevation data from other sources, and the building model. Before creating a building model, it may be necessary to first obtain the best pressure altitude data possible by fusing map and sensor data from available sources. Pressure and inertial data may be used together to remove pressure fluctuations. This data may also be used to determine whether a person is moving on a flat surface (potentially a floor if the person is in a building) by monitoring changes in this data as the person moves. When available, data from external pressure references and weather data (e.g., wind, temperature) may be used to remove pressure fluctuations due to weather. Terrain elevation, when available, may be used to determine the often-large pressure sensor offsets seen when computing pressure altitude. A building's height, when available, can be used to account for the "stack effect" in sealed high-rise buildings (i.e., airconditioned office buildings without operable windows). The stack effect can be observed when entering such a building as the pressure difference will cause air to rush in/out when the door is opened depending on the relative indoor/outdoor temperature. The building model (including floor heights) may be needed to enable the instructions to use the pressure altitude to compute the user's correct floor.

The building floor height model may be needed, but it is often unavailable. Asking users to create building models where floor height information is estimated tends not to be a good solution since it is very difficult for people to estimate floor heights correctly without measurement tools and the access needed to make such measurements. This is in part because people are not good at accurately estimating height and partially because in many buildings the actual floor to ceiling height is not visible or easily accessible due to the presence of a false ceilings and floors. When floor height estimates are off by even a small amount, in a large building, that error may add up over multiple floors resulting in a tracked person being placed on the wrong floor.

The present disclosure provides a solution to the particular problem of computing the building elevation model based on sensor data from the body worn/carried sensors as a tracked person walks around in the building. Each time the person transitions from one floor to another the solver adds an observation to the building state model. The building state model maintains the best estimate of the distances between floors and elevation of the main floor relative to the terrain based on the measured data from all users.

The solver may operate with or without user input. For example, when running tracking instructions, elevation data may be crowdsourced without taking input from users; the building model solver may runs in the background as part of the location service. When running mapper instructions, each time the user transitions between floors, the instructions may present the user with the estimated floor and prompt the user to confirm: the user may confirm the estimated floor, correct the floor, or ignore the prompt (when running a crowdsourced version of the mapper system). When a user confirms the new building floor number through the mapper user interface and instructions, the uncertainty in the measurement is reduced.

One approach to maintaining the building state model may be to use a Kalman Filter to estimate the building model (building floor heights and floor height uncertainty, region offset from floor and offset uncertainty, terrain offset and offset uncertainty) based on measurements obtained as tracked users traversing a building. The updates improve the model accuracy and model confidence based on input from many tracked users.

When a tracked person has good floor accuracy (for example, when they intentionally check-in on a floor) the uncertainty in the floor height estimate may be significantly improved. With user input, whether a user is modeling a simple office building or a more complex structure like a stadium, the model will quickly converge with high confidence.

When solving the floor heights without user input, assumptions may be made on standard floor height for a building of this size and type. For example, office building floors are between ~2.5-4.5 meters. The number of floors may be entered a priori or discovered as the tracked users traverse the building. Any a priori information improves the speed of convergence. For example, building height may be available from digital surface models that might be obtained from image or LIDAR data.

A building floor height model and solver is also disclosed that infers building floor heights based on sensor data collected from carried sensors. The set of floor height estimates is called the "building state." "Building observations" are collected detailing changes in elevation and associated floor level changes. These observations are then used to create a building state that includes the current estimate of all floor heights, the offset from the terrain, and an associated covariance matrix. The covariance matrix represents both the floor height uncertainties per floor and the correlation of those uncertainties between floors.

If a building model exists based on user entered data (e.g. number of floors), crowdsourced data, or a priori mapping, the solver ingests that model. If no model exists, the building may start with only one floor. Each known floor is set to a default floor height value and a covariance matrix (indicating the uncertainty of floor heights computation). For example, the building model is (F,M) where F (n×1) is a mean floor height vector with a length equal to the number of floors (n). F is initialized to default floor height values (e.g., 3.5 m) if a priori values don't exist, or it is initialized to the crowdsourced values or pre-mapped values if they do exist.

M is the (n×n) covariance matrix. If M doesn't exist based on prior mapping, it is initialized to σ *I where I is the (n×n) identity matrix and a is the covariance estimate which is chosen large when there is no information and it is chosen less large when F is based on crowdsourced data.

Each time a tracked person changes floors, the new solver uses the pair of floor observations to update the building model. So given, a start floor, and an end floor, the altitudeChange and altitudeStd (computed based on filtered pressure data), and a building model (F,M), define the floor selector row vector S (1×n) with 1's from start floor to end floor and otherwise 0's, e.g. [0 . . . 0 1 1 . . . 1 0 . . . 0]. Then the building model (F,M) is updated according to the following equations:

$$F=F+G*(altitudeChange-S*F)$$

$$M=M-G*S*M$$

where G=M*S' * (1/(S*M*S'+altitudeStd))

The solver is computationally efficient, so it can run on the cloud and locally on the mapper device. During mapping, new floors may be discovered and added on the fly by adding an element to the building state and other matrices.

If an input building model has only been partially solved, the unmapped floors are assumed to be the same as the nearest mapped floor.

Each observation can include a region if a floor contains these areas. Region offsets are appended to the state and defaulted to 0, indicating there is no difference in height.

At least while the building state model is converging, building state observations are saved. This enables manual or automated analysis of the budding observations to remove outliers.

In order to effectively debug and analyze changes to the building state and to develop the new building state model, administrative tools may be deployed that can pull all information for a selected building and display relevant details. FIG. 19 is an illustration of a building states tool 1900. A floor heights table 1902 shows the solved height of each floor in the building, the offset from the terrain, region offsets, and the associated error metrics. A correlation matrix 1904 shows a coded correlation matrix indicating the relationship between variables in the building state. Different colors or shades may be used to illustrate the correlations. A building observations table 1906 shows all of the input observations that are used to calculate the building state.

The budding states tool 1900 may also provide the ability to manually remove observations from the calculation of the building state due to user error (for example, if a user checks in on the wrong floor). An administrator is able to visualize the results of removing an outlier before persisting any changes.

Figure 20:
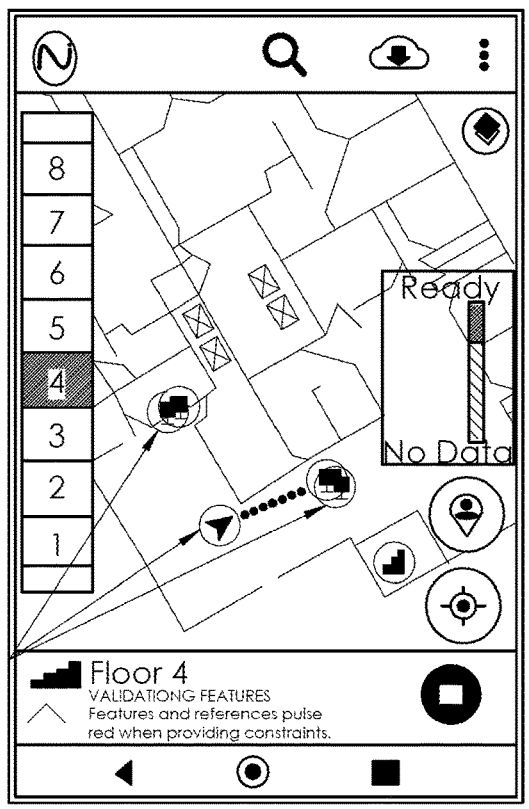
FIG. 20 is an illustration of a mapping validation for beacon corrections.
Figure 21:
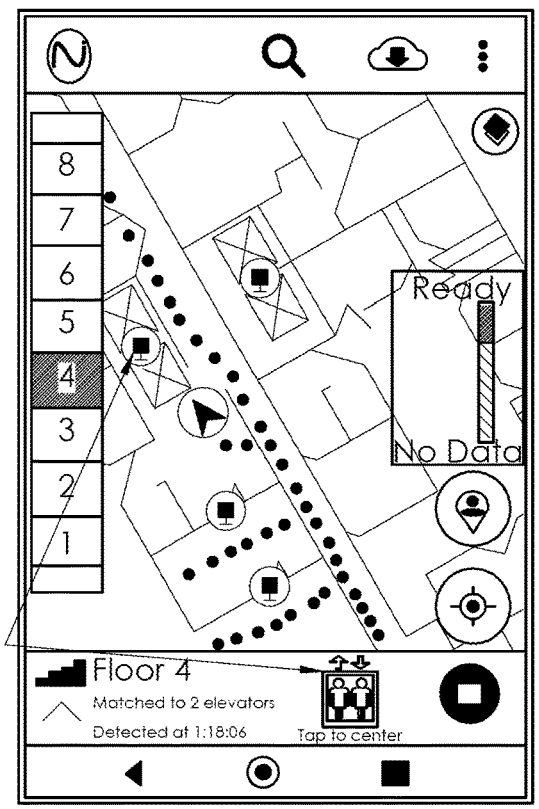
FIG. 21 is an illustration of a mapping validation for elevator corrections.
Figure 22:
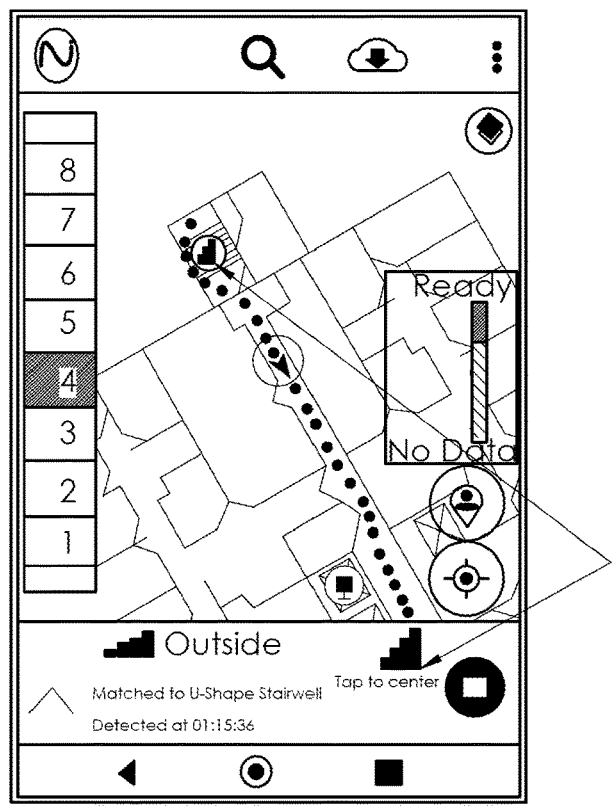
FIG. 22 is an illustration of a mapping validation for stairwell corrections.

After the map has been created, the user may choose to switch the mapper device to a validation mode and easily verify the map by walking around in the building. When in validation mode, the mapper device user interface will indicate when the user is getting corrections from connectors, signal fingerprints, RF beacons or floors. For example, the user may be notified and a stairwell might be highlighted when the user corrects some aspect of the stair. Similarly, a beacon may be highlighted to indicate that the user is within a certain range of a beacon, or a grid may be highlighted to indicate a correction is being made to a particular grid. In on embodiment, as a tracked person walks around inside of a building, features that are being used for correction may be identified in some way, such as a pulsing red circle around a feature. Notes may also be provided for structural features in the bottom bar of the user interface. On floor changes, the user interface of the mapper device may display a temporary notification of the new floor being detected. FIG. 20 illustrates a mapping system validation for beacon corrections. FIG. 21 illustrates a mapping system validation for elevator corrections. FIG. 22 illustrates a mapping system validation for stairwell corrections.

Embodiments include a method for creating a building model of a building, comprising: detecting one or more floors of the budding as a user wearing or carrying a mobile tracking device moves into and within the building, each floor containing at least one region, the one or more floors forming outline of the building model; detecting one or more structural features within each floor based at least on the user's movement within the building; comparing the one or more detected structural features to a database of previously collected structural features to determine if the detected structural features match any of the previously collected structural features; when the detected structural feature matches one previously collected structural feature among the previously collected structural features, adding the detected structural feature to the building model, when the detected structural feature matches two or more previously collected structural feature among the previously collected structural features, requesting the user to select one previously collected structural feature among the two or more previously collected structural features as matching the detected structural feature and adding the detected structural feature to the building model; and when the detected structural feature does not match any previously collected structural feature among the previously collected structural features, requesting the user to indicate one of discarding the detected structural feature or adding the detected structural feature to the building model as a new structural feature.

The embodiment further comprising editing the building model based on input received from the user, wherein editing includes one or more of adding a floor, deleting a floor, modifying a floor, adding a region, deleting a region, modifying a region, adding a structural feature, deleting a structural feature, and modifying a structural feature.

The embodiment further comprising: detecting one or more signal features within each floor based at least on the user's movement within the building; comparing the one or more detected signal features to a database of previously collected signal features to determine it the detected signal features match any of the previously collected signal features; and when the detected signal feature matches one previously collected signal feature among the previously collected signal features, adding the detected signal feature to the building model. The embodiment, wherein the comparing is based on a RF fingerprint created from sensor data collected from the mobile tracking device.

The embodiment further comprising accepting a feature descriptor that describes at least one of the detected structural features. The embodiment, wherein the feature descriptor describes one or more of an entry direction, and exit direction, and a winding direction.

The embodiment, wherein at least one floor among the one or more floors includes a collection of regions including a main region and one or more additional regions offset from the main region and one or more connectors, and wherein the one or more connectors visually indicate an elevation change between one or more of two floors among the one or more floors and two regions among the one or more additional regions. The embodiment, wherein the one or more connectors include one or more of stairs, an elevator, and a ramp. The embodiment wherein the one or more connectors include one or more of an entry and an exit.

The embodiment, wherein detecting one or more floors includes receiving a collection of floors corresponding to the building and editing the collection of floors as the mobile tracking device moves into and within the building.

The embodiment, further comprising providing to the user through the mobile tracking device an indication of whether the mobile tracking device is ready to detect the one or more structural features. The embodiment, wherein the mobile tracking device is ready when the three-dimensional positior3 error and heading error of the mobile tracking device have low uncertainty. The embodiment, wherein the indication includes a bar scale indicating degrees of readiness. The embodiment, wherein the indication further includes text identifying the mobile tracking device's current location inside or outside the building.

The embodiment, further comprising inferring a floor height of each floor among the one or more floors based on sensor data collected from the mobile tracking device. The embodiment, wherein the sensor data includes elevation data. The embodiment, wherein inferring is based on the building model (F,M), wherein F is a mean floor height vector having a length equal to a known number of floors in the building based on the building model and M is based on a covariance matrix, and wherein each time the mobile tracking device moves from one floor to another floor the building model (F,M) is updated according to $$F = F + G*(\text{altitudeChange} - S*F); \text{ and}$$

$$M = M - G*S*M,$$

wherein $G = M*S'*(1/(S*M*S' + \text{altitudeStd}))$, wherein S is a floor selector row vector, wherein altitudeChange is a change in altitude between the one floor and the another floor, and wherein altitudeStd is an altitude at terrain level relative to the building. The embodiment, wherein F is initialized to one of a default floor height value or an a priori value including one of a crowdsourced value or a pre-mapped value. The embodiment, wherein M is initialized to $\sigma*I$, where I is a (n×n) identity matrix and a is a covariance estimate chosen large when F is based the default floor height and chosen less large when F is based on the a priori value.

The embodiments of the present disclosure, while illustrated and described in terms of various embodiments, are not limited to the particular description contained in this specification. Additional alternative or equivalent components and elements may be readily used to practice the present disclosure.

What is claimed:

1. A method for generating a building model, comprising:
   collecting sensor data from a mobile tracking device traversing a building structure;
   generating at least one connector representing a path of the mobile tracking device, wherein each connector comprises one or more connector polygons representing a structural feature of the building structure and a plurality of connection points;
   generating a routing graph comprising the at least one connector, and indicative of a route through a portion the building structure; and
   combining a plurality of routing graphs to generate a building model.

2. The method of claim 1, further comprising:
   generating descriptor data from the sensor data,
   identifying one or more structural features based on the at least one connector and descriptor data; and
   adding the structural feature to at least one of the routing graph and the building model.

3. The method of claim 2, wherein the structural feature includes one or more of an elevator, a ramp, a tunnel, a stairwell, a stair platform, a skywalk, an entrance, an exit, a transition feature, a hallway, an intersection, a room, and an elevation change.

4. The method of claim 2, wherein descriptor data is obtained at one or more points of interest within or surrounding the building structure.

5. The method of claim 4, wherein the point of interest is at least one of a location, an elevation, a floor number, and an area with specific signal strength.

6. The method of claim 2, wherein the at least one connector is based on the descriptor data.

7. The method of claim 1, wherein generating the routing graph includes comparing the at least one connector to previously identified data, including one or more of connectors, structural features, and building models.

8. The method of claim 1, further comprising: validating a placement of the connector within the routing graph based on user input.

9. The method of claim 1, further comprising: updating at least one of a size, a location, and an orientation of the connector based on user input.

10. The method of claim 1, further comprising storing one or more of the at least one connector, the routing graph, and the building model in a database.

11. The method of claim 1, wherein the building model includes one or more structural features, and wherein the one or more structural features are based on the at least one connector.

12. The method of claim 11, wherein the one or more structural features include a tunnel shaped area above or below ground.

13. The method of claim 11, wherein the tunnel shaped area is further based on descriptor data including information about a change in elevation within the tunnel shaped area.

14. The method of claim 1, wherein the at least one connector is a plurality of connector polygons representing a tunnel.

15. The method of claim 14, further comprising collecting descriptor data associated with the plurality of connector polygons.

16. The method of claim 15, wherein the descriptor data includes pressure altitude data.

17. The method of claim 15, wherein the descriptor data includes shape data.

18. A method for generating a building model, comprising:
- collecting sensor data from a mobile tracking device traversing a building structure;
- generating at least one connector representing a path of the mobile tracking device, wherein each connector comprises a plurality of connection points, wherein the at least one connector is a plurality of connector polygons representing one or more structural features;
- generating a routing graph comprising the at least one connector, and indicative of a route through a portion the building strucutre; and
- combining a plurality of routing graphs to generate a building model.

19. A method for generating a building model, comprising:
- collecting sensor data from a mobile tracking device traversing a building structure;
- generating at least one connector representing a path of the mobile tracking device, wherein each connector comprises a connector polygon representing a structural feature of the building structure;
- generating a routing graph comprising the at least one connector, and indicative of a route through a portion the building structure;
- combining a plurality of routing graphs to generate a building model;
- generating descriptor data from the sensor data,
- identifying one or more structural features based on the at least one connector and descriptor data; and
- adding the structural feature to at least one of the routing graph and the building model, wherein the one or more structural features are unique in the building model.

* * * * *